Patented Mar. 13, 1951

2,545,182

UNITED STATES PATENT OFFICE 2,545,182

PRODUCTION OF POLYALLYL-TYPE ALCOHOLS FROM POLYALLYL-TYPE FORMATES

Richard R. Whetstone, Berkeley, and Theodore W. Evans, Oakland, Calif., assignors to Shell Development Company, San Francisco, Calif., a corporation of Delaware No Drawing. Application March 17, 1947,
Serial No. 735,256

10 Claims. (Cl. 260—91.3)

This invention relates to a process for the production of polyallyl-type alcohols. More particularly the invention relates to a process for the manufacture of polyallyl-type alcohols from a polymer of a formic acid ester of an allyl-type alcohol.

More specifically, the invention provides a practical and highly economical method for the production of relatively pure polyallyl-type alcohols from esters of formic acid and allyl-type alcohols which comprises reacting a polymer of the formic acid ester of the allyl-type alcohol with water and a monohydric alcohol in the presence of formic acid, and removing, preferably by distillation, the formic acid ester of the monohydric alcohol substantially as fast as it is formed in the reaction. The polyallyl-type alcohols produced by the process of the invention have a relatively low production cost and possess a very high degree of purity and chemical activity. Such properties are far superior to those of the polyallyl-type alcohols produced by the previously known methods of production and enable the polyallyl-type alcohols produced by the invention to be used for many important industrial applications for which the inferior products of the prior art are entirely unsuited.

Polyallyl-type alcohols, i. e. polymers of monomeric allyl-type alcohols, have shown promise as replacements for glycerol in the production of alkyl resins and in the production of synthetic and semi-synthetic drying oils. The polyallyl-type alcohols are particularly adaptive to this type of utility as they possess a plurality of free hydroxyl groups which are presumably all primary and therefore readily undergo esterification. The structure of the polyallyl-type alcohols is not definitely known but is presumed that they have a general structure which is conveniently represented by a probable structural formula for polyallyl alcohol:

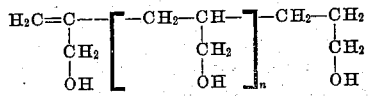

wherein $n$ represents an integer, the value of which is dependent upon the number of monomer units present in the polymer. The above possible structure is suggested only for a better understanding of the invention, and it should be understood that the invention is not to be construed as limited to polymers of such a structure.

Various methods are known for the production of the above-described polyallyl-type alcohols but they have met with such difficulties as to discourage their use to produce the polyallyl type alcohols on a commercial scale. A direct polymerization of the allyl-type alcohols in general proceeds slowly and incompletely and requires the presence of oxygen-yielding polymerization catalysts for best results. This method does not yield a suitable product as the oxygen-yielding catalyst oxidizes the free primary hydroxyl groups to some extent to aldehyde and/or carboxyl groups and the presence of such groups causes a discoloration of the polyallyl-type alcohols. The method of producing the polyallyl-type alcohols by the water hydrolysis of some of the esters of the polyallyl-type alcohols, such as allyl formate, has proven unfeasible as the product is produced in low yields and is difficult to purify to the extent desired for commercial purposes. The use of methods depending upon an alkaline hydrolysis of the esters of the polyallyl-type alcohols has, likewise, proved unfeasible as it requires large amounts of alkali, i. e. one equivalent amount of base to the polymer reacted, and secondly, the separation of the salts produced is difficult especially with the polymers of lower allyl-type alcohols which are water soluble. The hydrolysis of the polymeric esters using mineral acids as catalysts has the disadvantage that the polyallyl-type alcohols produced are discolored or have poor color stability. The known methods for the alcoholysis of the esters of the polyallyl-type alcohols by treating the esters with low boiling alcohols have the disadvantage of requiring relatively expensive alcoholates as catalysts and requiring long reaction periods and cumbersome methods for the separation of the final product from the reaction mixture. In general, the known methods are either too expensive or give too impure products to enable the polyallyl-type alcohols to be produced on a scale where they might successfully compete with glycerol and pentaerythritol in the applications described above.

It is an object of the invention, therefore, to provide a practical method for the production of polyallyl-type alcohols which avoids the difficulties of the previously known methods and enables the production of the polymeric alcohols in an efficient and economical manner. It is a further object of the invention to provide a method of manufacture of polyallyl-type alcohols which avoids the use of expensive catalysts and employs a very simple and convenient method for the separation of the final product from reaction mixture. It is a further object of the invention to provide a process for the production of polyallyl-type alcohols which produces high yields of polymeric alcohols which are relatively pure, possess a high resistance to discoloration and possess a plurality of active primary hydroxyl groups. Other objects of the invention will be apparent from the detailed description given hereinafter.

It has now been discovered that polyallyl-type alcohols may be produced in a practical and economical manner by the novel method of reacting a polymer of a formic acid ester of an allyl-type alcohol with water and a monhydric alcohol in the presence of formic acid and removing preferably by distillation, the formic acid ester of the monohydric alcohol from the reaction mixture substantially as fast as it is formed therein. It has further been discovered that the polyallyl-type alcohols produced by the process of the invention are formed in relatively high yields and possess a high degree of purity and resistance to discoloration as well as an increased number of free, primary hydroxyl groups. Such an economical and efficient method enables the polyallyl-type alcohols to be produced on a commercial scale where they might compete successfully with other polyhydric alcohols in those utilities demanding a relatively pure and reactive polyhydric compound.

The exact nature of the reaction occurring in the execution of the process of the invention is not definitely known but is thought to consist of a mixed hydrolysis-alcoholysis reaction wherein the water and monohydric alcohol react with the polymeric allyl-type formate, in the presence of formic acid, to form the formic acid ester of the monohydric alcohol which is readily removed from the reaction mixture, preferably by distillation wherein the said ester is removed overhead as an azeotrope with water. It is preferred to use the allyl-type alcohol employed in the production of the polymer of the formic acid ester as the monohydric alcohol in the reaction for by this preferred method the allyl-type formate recovered from the distillation may be recycled and used in the production of the polymeric allyl-type formate starting material and in this way greatly reduce the cost of preparing the polyallyl-type alcohols in the desired purified form.

The polyallyl-type formate used in the process of the invention is the polymer of a monomeric ester of formic acid and an allyl-type alcohol. By the term "allyl-type" as used throughout the specification and appended claims is meant those alcohols having an unsaturated linkage, preferably a double bond, between two carbon atoms of aliphatic character, one of which is attached directly to a saturated carbon atom which in turn is attached directly to the hydroxyl group. The carbon atoms of aliphatic character are the carbon atoms in an open chain, for example, the carbon atoms in aliphatic radicals, and also the carbon atoms in cycloaliphatic radicals, e. g. the carbon atoms in the cyclohexyl and cyclohexenyl radicals. Allyl-type alcohols have the structure

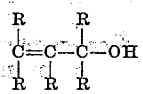

wherein each R is the same or different substituent of the group comprising the hydrogen atom, a halogen atom, or an organic radical. Allyl-type alcohols may also be described as beta-gamma olefinic unsaturated alcohols wherein the carbon atom bearing the hydroxyl group is termed the alpha carbon atom and the unsaturated carbon atoms are the beta, gamma carbon atoms.

Preferred organic radicals which R may represent in the above-described formula for the allyl-type alcohols are the hydrocarbon radicals. Such hydrocarbon radicals are monovalent and may be substituted or unsubstituted, saturated or unsaturated, cyclic or alicyclic or aromatic. Examples of the hydrocarbon radicals which R may represent are methyl, ethyl, propyl, n-butyl, isobutyl, n-pentyl, 2-chloroethyl, hexyl, 2,4-dichlorocyclohexyl, 2,3,5-trimethyldecyl, methyl vinyl carbinyl, phenyl, tolyl, 2-chlorophenyl, 3-aceto-cyclohexyl, anthryl, 3-bromo-2-cyclohexenyl, 3-vinyl-2-cyclohexenyl, 2-chlorocyclopentyl, and 3-nitro-butyl. The more preferred hydrocarbon radicals which R may represent are the alkyl radicals, preferably the lower alkyl radicals, e. g. methyl, ethyl, propyl and butyl up to those containing 8 carbon atoms.

A few representative examples of allyl-type alcohols are 2-buten-1-ol, 2-hexen-1-ol, 2,4-hexadien-1-ol, 2,3-butadien-1-ol, 3,7-dimethyl-2,7-octadien-1-ol, 2-cyclohexen-1-ol, 2-cyclopenten-1-ol, 2-chloromethyl-2-buten-1-ol, 4-phenyl-2-penten-1-ol, 3'(3-bromo - 2 - cyclohexenyl) - 2'-penten-1'-ol.

A particularly preferred group of allyl-type alcohols are those beta-gamma unsaturated alcohols of the first general structural formula given hereinabove wherein each R is a substituent selected from the group consisting of hydrogen and a hydrocarbon radical, preferably an alkyl radical containing from 1 to 8 carbon atoms with the total number of carbon atoms in the allyl-type alcohol consisting of from 3 to 18 carbon atoms. Representative examples of especially preferred allyl-type alcohols are allyl alcohol, methallyl alcohol, ethallyl alcohol, 2-buten-1-ol, 2-isopropyl-2-propen-1-ol, 2-butyl-2-propen-1-ol, 2-chloromethyl-2-propen-1-ol, 2-ethyl-2-hexen-1-ol, 2-hepten-1-ol and 2-pentyl-2-octen-1-ol.

The monomeric esters of formic acid and the allyl-type alcohols described above may be produced by any suitable process. One method comprises treating a sodium or silver salt of formic acid with the halide of the desired allyl-type alcohol in the presence of a catalyst. Another method comprises reacting an ester of formic acid and a low boiling alcohol with the desired allyl-type alcohol wherein there is an exchange of the allyl-type alcohol for the low boiling alcohol in the ester molecule. The simpler and more preferred method, however, is to treat the formic acid directly with the allyl-type alcohol and separate the desired ester from the reaction mixture by distillation.

The polymerization of the monomeric ester of formic acid and the allyl-type alcohol to produce the polymeric formate, which is a reactant in the process of the invention, may be accomplished by any suitable polymerization method. Such methods includes the polymerization of the formic acid esters by the application of heat, light, catalysts, etc. The more preferred method is to subject the formic acid ester to heat, preferably in the presence of a polymerization catalyst.

The reaction conditions selected for the polymerization process will determine the molecular weight and structure of the polymeric formate which will in turn determine the molecular weight and structure of the desired polyallyl type alcohols. The exact polymerization conditions should, therefore, be determined in each case according to the form of polyallyl-type alcohols desired as the final product.

In the preferred method for the polymerization of the esters of formic acid and the allyl-type alcohols by the application of heat in the presence of a polymerization catalyst, the temperature employed will determine the molecular weight of the desired polymer and the reaction temperature may therefore be varied according to the particular molecular weight desired. Temperature of from about 70° C. to about 90° C. produce polymers having a molecular weight of around 2000. As the temperature is increased the molecular weight of the polymer decreases until at about 250° C. the molecular weight is about 500. Polymers of the esters of formic acid and the allyl-type alcohols having molecular weights in the range of about 2000 to about 500 have given very satisfactory results in the process of the invention and the polymerization temperatures of about 70° C. to about 250° C. are therefore the more preferred. High or lower temperatures, however, may be used if deemed desirable or necessary.

The preferred polymerization reaction is conducted in the liquid phase. The pressure to be used in each case will, therefore, depend upon the particular allyl-type formate and particular polymerization temperature to be employed. In those cases where the polymerization is to take place below the boiling point of the desired allyl-type formate atmospheric pressure is preferred, while in those instances where the polymerization is to take place above the boiling point of the ester superatmospheric pressure is required.

The time of polymerization will vary over a considerable period depending upon the particular polymerization temperature selected. The time of polymerization may vary, for example, from about 30 minutes or less when a polymerization temperature of about 250° C. is used to as much as 50 hours when a polymerization temperature of 70° C. is employed.

Catalysts are usually added in the polymerization process to hasten the polymerization. The preferred catalysts are those which are soluble in the polymerizable ester. Benzoyl peroxide has been found very satisfactory. Other suitable polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxide, di-tertiary alkyl peroxides, peracetic acid, perphthalic acid, etc. The amount of the catalyst used will vary under various conditions but ordinarily will be between about 0.01% to about 5% by weight of the ester being polymerized.

A process for the polymerization of allyl type esters in the presence of oxygen and oxygen-yielding catalyst is described more completely in the copending application of Adelson and Dannenberg Serial No. 417,278, filed October 31, 1941 now abandoned.

The esters may be polymerized in bulk in the presence or absence of a solvent or diluent. The use of solvents such as iso-octane in some cases tend to assist in decreasing the molecular weight of the final polymer. The polymerization may be carried to completion without substantial interruption or it may be stopped at any point short of completion to obtain the desired extent of polymerization.

The polymers of formic acid and the allyl-type alcohols produced by any suitable method are treated, according to the process of the invention, with water and a monohydric alcohol in the presence of formic acid to convert the polymer into a polyallyl type alcohol. The allyl type alcohol identical to the one used in producing the polymeric formic acid ester is the more preferred of the monohydric alcohols to be used in the reaction. However, other monohydric alcohols may be used. It is preferred, in general, that the other alcohols used be the lower members of the series which contain not more than 6 carbon atoms in the molecule, while the monohydric alcohols containing not more than 4 carbon atoms are still more preferred. The monohydric alcohols may be either saturated or unsaturated. Representative examples of suitable monohydric alcohols are methyl alcohol, ethyl alcohol, n-propyl alcohol, isopropyl alcohol, n-butyl alcohol, the amyl alcohols, the hexyl alcohols, cyclohexanol, allyl alcohol, beta-methallyl alcohol, methyl vinyl carbinol, cyclopentanol, propargyl alcohol and the like. The primary alcohols are the more preferred as it is found that they have greater reactivity than the secondary alcohols.

The amount of the monohydric alcohol to be added to the reaction mixture should be sufficient to accomplish the desired hydrolysis-alcoholysis reaction and combine with the formic acid being released. In general, the amount of alcohol may vary from slightly more than 1 to about 7 moles for every formate group

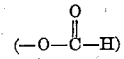

present in the polyallyl-type formate molecule. Larger amounts may be used, but in general, add nothing to the efficiency of the process. Particularly fine results in yield and purity of product are obtained when the amount of the monohydric alcohol taking part in the reaction varies between about 2 to about 4 moles for every formate group present in the polyallyl-type formate molecule, and such a range is the more preferred for the process.

The amount of water added to the reaction mixture to effectuate the combined hydrolysis-alcoholysis reaction may vary over a considerable range. The amounts of water added may, for example, vary from as high as 48 moles per formate group present in the polyallyl-type formate molecule to as low as about 2 moles per formate group. Small amounts of water, i. e. about 2 to about 6 moles per formate group, in general, produce the desired results, are much more efficient to handle and are, therefore, the more preferred amounts of water to be used in the reaction.

The quantity of formic acid catalyst to be added to the reaction mixture may vary over a wide range depending upon the particular polyallyl-type formate being acted upon and the speed of reaction desired. In general, an amount of formic acid varying from about .01% to about 5% by weight of the polyallyl-type formate being treated has been found to produce the maximum reaction rates for most of the polyallyl-type formates being treated. Amounts of formic acid greater than 5% usually do not cause any further increase in the reaction rate. Amounts of formic acid as small as 2% to about 4% by weight of the polyallyl-type formate being treated usually give efficient reaction rates and are the preferred quantities of catalyst to be employed.

The combined hydrolysis-alcoholysis reaction takes place at low temperatures, i. e. around room temperatures, but it has been found advantageous to maintain the temperature of the reaction at least above about 50° C. The temperature may vary above 50° C. up to the decomposition temperature of the polymers present in the reaction mixture but, in general, it has been found that the most efficient results are obtained when the temperature is maintained between about 50° C. to about 150° C. and this is the more preferred temperature range to be used for the reaction.

The removal of the ester of formic acid and the monohydric alcohol formed by the hydrolysis-alcoholysis reaction from the reaction mixture may be accomplished by any suitable method. A very efficient method due to the particular composition of the reaction mixture is to subject the reaction mixture to distillation wherein the ester of formic acid and the monohydric alcohol is removed as an azeotrope with water. The distillation temperature to be used in this method of separation will depend upon the particular formic acid ester: water azeotrope being distilled. Such temperatures will usually range from about 65° C. to about 95° C., however, the exact range may best be determined for each individual case. In the preparation of polyallyl alcohol, for example, using allyl alcohol as the monohydric alcohol and a ratio of reactants of about 1:4:5 the allyl formate-water azeotrope distills at a stillhead temperature of between 74° C. to about 76° C. at 760 mm. of mercury pressure.

At completion of the azeotropic distillation the residual reaction mixture will usually consist of polyallyl-type alcohol, water and the monohydric alcohol. The water and monohydric alcohol are readily removed from the polyallyl-type alcohol by distilling the mixture under reduced pressure at a temperature above the azeotropic distillation temperature. To remove the water and allyl alcohol in the example cited above for the preparation of polyallyl alcohol the temperature is raised from 76° C. (azeotropic distillation temperature) to between about 100° C. to about 120° C. at 2 to 4 mm. mercury pressure.

The process of the invention may be conducted in any type of vessel suitable for such a combined hydrolysis-alcoholysis reaction. It may be conducted in a continuous, semi-continuous or batch-wise manner. If a continuous process is resorted to it may be preferably so arranged as to permit the unreacted reactants to be recovered and recycled to the reaction chamber, and in those cases where the monohydric alcohol used in the reaction is identical with the alcohol used to produce the polymeric formic acid ester it may be preferably so arranged as to permit the recycling of the allyl-type formate, recovered from the process, back to the step wherein the polymerization of the initial allyl-type formate is accomplished.

The process of the invention is characterized by the economy with which it may be carried out and by the purity and high activity of the polyallyl-type alcohols produced therefrom. The polyallyl-type alcohols produced are colorless viscous liquids or solids possessing a linear type structure of from about 5 to about 30 or more of the basic monomeric allyl-type alcohols having a structural formula presumably like that structure described hereinabove. The products thus possess about 5 to about 30 or more free primary hydroxyl groups which are highly reactive and make their use in the production of alkyd resins, etc. highly desirable. They are particularly superior to polyvinyl alcohol in this regard as the hydroxyl groups in polyvinyl alcohol are secondary in character and they are superior to glycerols wherein the hydroxyl groups are primary and secondary.

The polyallyl-type alcohols produced by the invention have a great variety of applications. They are useful, for example, as sizing materials for textiles and fabrics, and as greaseproof impregnating agents for paper and the like. The usefulness of the products as chemical intermediates is extensive. They may react with polycarboxylic acids or anhydrides to form new alkyd resins, with aldehydes to form resinous acetals, with nitric acid to form nitrate explosives, and with unsaturated acids to give drying oil.

To illustrate the manner in which the process of the invention may be carried out the following examples are given. It is to be understood, however, that the examples are for the purpose of illustration and the invention is not to be regarded as limited to any of the reactants or operative procedures recited therein.

*Example I*

Polyallyl formate is produced by subjecting liquid allyl formate containing about 1% by weight of ditertiary butyl peroxide to a temperature of between about 200° C. and 210° C. The resulting polymer is a light yellow liquid with a Gardner-Holdt viscosity of $Z_1$-$Z_2$, and an average molecular weight of about 665 (ebullioscopic in toluene) equivalent to a polymerization degree of 7.7.

About 210 parts of the polyallyl formate produced above is heated under a distillation column with about 306 parts of allyl alcohol, 225 parts of water and about 4 parts of formic acid as the catalyst. At a temperature of 74° C. to 76° C. the allyl formate: water azeotrope is distilled off by operating alternately on total reflux and total take off. At the end of a 13 hour period, 92% of the calculated amount of allyl formate is recovered. A further distillation of the mixture to about 100° C. to 120° C. at 2 to 4 mm. mercury pressure removes the last traces of water and allyl alcohol. The residue remaining in the flask is solid polyallyl alcohol having an acetyl value of 1.38 eq./100 g., ester value of .073 eq./100 g.

*Example II*

About 200 parts of the polyallyl formate produced in Example I is heated under a distillation column with about 564 parts of allyl alcohol and about 214 parts of water with about 4 parts of formic acid as the catalyst. The allyl formate: water azeotrope distills off at 74° C. to 76° C. At the end of the 13 hours' period 90% of the calculated allyl formate is distilled off. A further distillation of the mixture to about 100° C. to 120° C. at 2 to 4 mm. mercury pressure removes the last traces of impurities. The residue remaining in the flask is solid polyallyl alcohol having an acetyl value of 1.42 eq./100 g. and ester value of .077 eq./100 g.

*Example III*

Approximately 210 parts of the polyallyl formate of Example I is heated under a distillation column with about 300 parts of ethyl alcohol and about 225 parts of water with about 4 parts of formic acid as the catalyst. The ethyl formate: water azeotrope is distilled off by alternate total reflux and total take off. After 13 hours of treatment about 95% of the calculated amount of ethyl formate is recovered. A further distillation of the mixture to about 100 to 120° C. at 2 to 4 mm. mercury pressure removes the last traces of impurities. The residue remaining in the flask is relatively pure, solid polyallyl alcohol.

*Example IV*

Polymethallyl formate is produced by subjecting liquid methallyl formate containing about 2% by weight of di-tertiary butyl peroxide to a temperature of about 210° C. The resulting polymer is a light yellow liquid having an average molecular weight of about 700.

About 200 parts of the polymethallyl formate produced above is heated under a distillation column with about 550 parts of methallyl alcohol and about 214 parts of water with about 4 parts of formic acid as the catalyst. The methallyl formate : water azeotrope is distilled off by alternate total reflux and total take off. After about 10 hours of treatment approximately 90% of the methallyl formate has been recovered. A further distillation of the mixture removes the last traces of water and methallyl alcohol and leaves as residue in the flask solid polymethallyl alcohol.

*Example V*

Approximately 201 parts of the polymethallyl formate produced in Example IV is heated under a distillation column with about 550 parts of butyl alcohol and about 215 parts of water with about 5 parts of formic acid. The butyl formate : water azeotrope is distilled over to give a 90% recovery in about 10 hours of treatment. Continued distillation removes water and butyl alcohol and gives as residue in the flask, very light yellow, solid polymethallyl alcohol.

We claim as our invention:

1. A process for the production of polyallyl alcohol which comprises reacting polyallyl formate with water and a monohydric alcohol of the group consisting of beta-gamma monoolefinic, monohydric, alcohols containing from 3 to 18 carbon atoms and saturated, monohydric alcohols containing from 1 to 6 carbon atoms, in the presence of 2% to 4% by weight of formic acid based on the weight of the polyallyl formate, and removing the formed ester of the monohydric alcohol and formic acid from the reaction mixture substantially as fast as it is formed therein, the monohydric alcohol and water being added to the initial reaction mixture in such quantities that there will be at least in excess of one mole of monohydric alcohol and at least two moles of water for each formate group present in the polyallyl formate molecule.

2. A process for producing polyallyl alcohol which comprises heating polyallyl formate with allyl alcohol and water in the presence of .01% to 5% by weight of formic acid based on the weight of the polyallyl formate, removing the formed allyl formate from the reaction mixture substantially as fast as it is formed therein, the allyl alcohol and water being added to the initial reaction mixture in such quantities that there is at least in excess of one mole of allyl alcohol, and at least two moles of water for every formate group present in the polyallyl formate molecule, and said heating being conducted at a temperature between 50° C. and the decomposition temperature of the polymers present in the reaction mixture.

3. A process for producing a polymer of a beta,gamma-monoolefinic, monohydric alcohol containing from 3 to 18 carbon atoms which comprises reacting a polymer of an ester of (1) formic acid and (2) a beta,gamma-monoolefinic, monohydric alcohol containing from 3 to 18 carbon atoms with water and a monomeric beta,gamma-monoolefinic monohydric alcohol identical with the one used in the preparation of the said polymer, in the presence of .01% to 5% by weight of formic acid based on the weight of the polymer of formic acid ester, removing the formed ester of formic acid and the monomeric monohydric alcohol from the reaction mixture substantially as fast as it is formed therein, the monomeric beta,gamma-monoolefinic monohydric alcohol and water being added to the initial reaction mixture in such quantities that there will be at least in excess of one mole of the said monomeric monohydric alcohol and at least two moles of water for every formate group present in the polymer of the formic acid ester.

4. A process for preparing polyallyl alcohol which comprises heating polyallyl formate with allyl alcohol and water in the presence of 3% by weight of formic acid based on the weight of the polyallyl formate, at a temperature between 50° C. and 150° C., and removing allyl formate from the reaction mixture by distillation substantially as fast as it is formed therein, the allyl alcohol and water being added to the initial reaction mixture in such quantities that there are 4 moles of alcohol and 5 moles of water for every formate group present in the polyallyl formate molecule.

5. A process for preparing polyallyl alcohol which comprises heating polyallyl formate with ethyl alcohol and water in the presence of 2% by weight of formic aicd based on the weight of the polyallyl formate, at a temperature between 50° C and the decomposition temperature of the polymers present in the mixture, and removing ethyl formate from the reaction mixture by distillation substantially as fast as it is formed therein, the ethyl alcohol and water being added to the initial raction mixture in such quantities that there is between 2 and 4 moles of alcohol and between 2 and 6 moles of water for every formate group present in the polyallyl formate molecule.

6. A process for preparing polymethallyl alcohol which comprises heating polymethallyl formate with methallyl alcohol and water in the presence of 2% to 4% by weight of formic acid based on the weight of the polymethallyl formate, and removing methallyl formate from the reaction mixture by distillation substantially as fast as it is formed therein, the methallyl alcohol and water being added to the initial reaction mixture in such quantities that there is between 2 and 4 moles of methallyl alcohol and 2 to 6 moles of water for every formate group present in the polyallyl formate molecule.

7. A process for producing polyallyl alcohol which comprises heating polyallyl formate with allyl alcohol and water in the presence of 2% to 4% by weight of formic acid based on the weight of polyallyl formate, at a temperature between 50° C. and 150° C., and removing allyl formate from the reaction mixture substantially as fast as it is formed therein, the allyl alcohol and water being added to the initial reaction mixture in such quantities that there is between 2 and 4 moles of allyl alcohol and 2 to 6 moles of water for every formate group present in the polyallyl formate molecule.

8. A process for producing a polymer of a beta,gamma-monoolefinic monohydric alcohol which comprises heating a polymer of an ester of (1) formic acid and (2) a beta,gamma-monoolefinc monohydric alcohol containing from 3 to 18 carbon atoms with water and a monomeric beta, gamma-monoolefinic monohydric alcohol containing from 3 to 18 carbon atoms in the presence of .01% to 5% by weight of formic acid based on the weight of the polymer of the formic acid ester of the beta-gamma-monoolefinic alcohol, at a temperature between 50° C. and the decomposition temperature of the polymers in the reaction mixture, the monomeric monoolefinic monohydric alcohol and water being added to the initial reaction mixture in such quantities that there is between 2 and 4 moles of alcohol and 2 to 6 moles of water for every formate ester group present in a molecule of the said polymer of the formic acid ester.

9. A process for producing a polymer of a beta, gamma-monoolefinic monohydric alcohol which comprises heating a polymer of an ester of formic acid and a beta,gamma-monoolefinic monohydric alcohol containing from 3 to 18 carbon atoms with water and a saturated aliphatic monohydric alcohol containing from 1 to 6 carbon atoms in the presence of .01% to 5% by weight of formic acid based on the weight of the said polymer of formic acid ester, at a temperature between 50° C. and 150° C., and removing the monomeric ester of formic acid and the saturated monohydric alcohol by distillation as fast as it is formed therein, the beta, gamma-monoolefinic monohydric alcohol and water being added to the initial reaction mixture in such quantities that there is between 2 and 4 moles of alcohol and 2 to 6 moles of water for every formate group present in the said polymer of the formic acid ester.

10. A process for producing a polymer of a beta,gamma-monoolefinic monohydric alcohol which comprises reacting a polymer of an ester of (1) formic acid and (2) a beta,gamma-monoolefinic monohydric alcohol containing from 3 to 18 carbon atoms with water and a monohydric alcohol of the group consisting of beta,gamma-monoolefinic monohydric alcohols containing from 3 to 18 carbon atoms and saturated monohydric alcohols containing from 1 to 6 carbon atoms in the presence of .01% to 5% by weight of formic acid based on the weight of the polymer of the formic acid ester, and removing the monomeric ester of formic acid and the monohydric alcohol from the reaction substantially as fast as it is formed therein, the monohydric alcohol and water being added to the initial reaction mixture in such quantities that there will be at least in excess of 1 mole of alcohol and at least 2 moles of water for every formate group present in the polymer of the formic acid ester.

RICHARD R. WHETSTONE.
THEODORE W. EVANS.

REFERENCES CITED

The following references are of record in the file of this patent:

UNITED STATES PATENTS

| Number | Name | Date |
|---|---|---|
| 2,430,372 | Stamatoff | Nov. 4, 1947 |
| 2,332,900 | D'Alelio | Oct. 26, 1943 |
| 2,360,308 | Thomas et al. | Oct. 10, 1944 |
| 2,378,169 | Agre et al. | June 12, 1945 |
| 2,467,105 | Adelson et al. | Apr. 12, 1949 |